United States Patent
McKenzie

[11] 3,734,557
[45] May 22, 1973

[54] ELASTOMERIC BUMPER

[75] Inventor: Ross A. McKenzie, Toronto 3, Ontario, Canada

[73] Assignee: National Rubber Company Limited, Toronto, Ontario, Canada

[22] Filed: Oct. 14, 1971

[21] Appl. No.: 189,452

[52] U.S. Cl. ................... 293/71 R, 267/140
[51] Int. Cl. ............................. B60r 19/08
[58] Field of Search ............ 293/1, DIG. 4, 62, 293/71 R, 71 P; 52/716, 717, 718; 267/139, 140; 152/311, 312, 354

[56] References Cited
UNITED STATES PATENTS

| 1,704,768 | 3/1969 | Sigman | 293/71 R |
| 3,057,389 | 10/1962 | DuBetz et al. | 152/354 |
| 3,575,251 | 4/1971 | Moore | 293/1 |

*Primary Examiner*—Gerald M. Forlenza
*Assistant Examiner*—Robert Saifer
*Attorney*—Leon Atthurs

[57] ABSTRACT

An integral elongated bumper having impact absorption properties for mounting on a conventional basic metal bumper of an automobile comprising an overlay of elastomeric material covering a core of elastomeric material having short fibers dispersed densely and randomly throughout said core and integrally bonded to the core substance, increasing the impact resistance of said core over that of the overlay.

13 Claims, 5 Drawing Figures

PATENTED MAY 22 1973  3,734,557
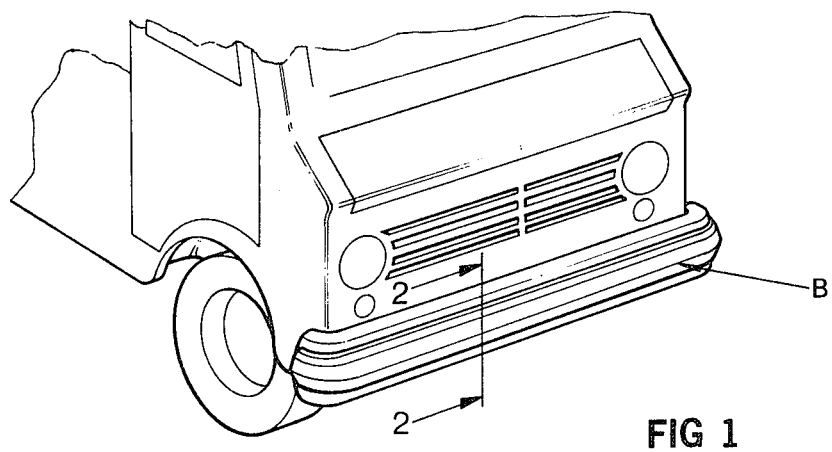
FIG 1
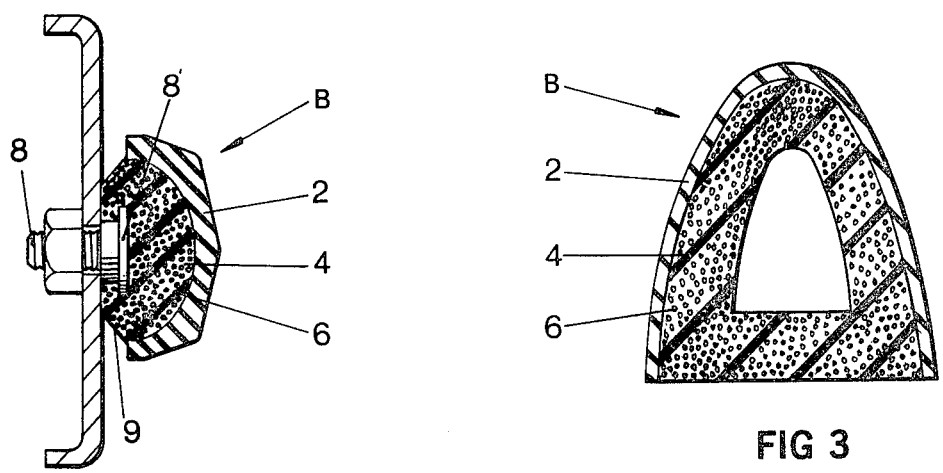
FIG 2
FIG 3
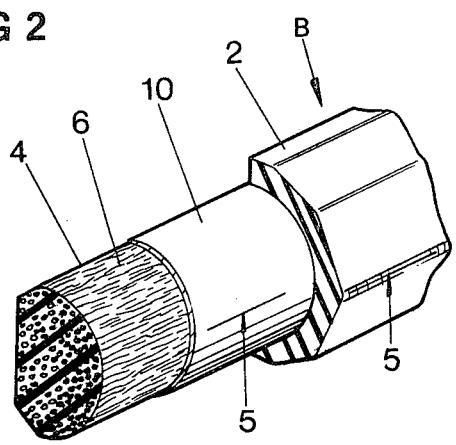
FIG 4
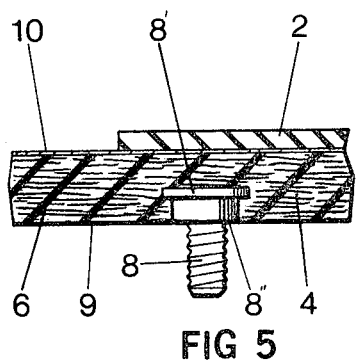
FIG 5
inventor:
R. A. McKENZIE
por: Leon Anthuns
agent

ELASTOMERIC BUMPER

This invention relates to improvement in elastomeric bumpers which are frequently mounted on the conventional basic metal bumper of an automobile and to the process of making them. Essentially, the elastomeric bumper with which the invention is concerned is for utilitarian purposes as distinguished from purely ornamental purposes. An example of utilitarian function within the scope of the invention is an elastomeric bumper attached to the basic bumper of a vehicle; an elastomer such as rubber being used as the component substance thereof because of its cushioning or shock absorbing properties. While virtually all the properties of rubber or its substitutes are variable within wide limits e.g., hardness, elasticity, color, grade and so forth, the invention is principally concerned with rubber or an equivalent elastomer of commercial character.

Moreover, while the invention contemplates bumpers formed of elastomeric material some of said elastomer contains a dispersion of fibers. To distinguish between them, the elastomer in which said fibers are dispersed will be hereinafter referred to as an elastomer composite or core while that without the dispersion will be referred to as an overlay or veneer of elastomeric material which, in the present embodiment, is integrally bonded to the core and carries the frontal configuration of the bumper.

An elastomeric bumper as contemplated by the present invention is frequently mounted on the conventional basic metal bumper of an automobile to cushion the impact which it receives in normal use and so prolong its useful life. Heretofore, such elastomeric bumpers tended to deteriorate rather rapidly according to the stresses to which they were exposed.

The elastomeric bumpers aforesaid are mounted on the automobile by the means of threaded studs which project rearwardly therefrom. In the past, having regard to the bumper substance heretofore used, it was necessary to wire the studs together in order to retain them in the elastomer against the impact shocks sustained in use. Apart from the problems of manufacture occasioned by the inter-wired studs, the fact is that the wire itself was capable of deformation by the shocks aforesaid which, in turn, often warped or deformed the elastomeric bumper itself and hence produced an unsightly result.

A principal object of the present invention, therefore, is to provide an elastomeric bumper having improved impact absorption properties coupled with better wearing qualities, resistance to abrasion and a low thermal coefficient of expansion.

A more specific object of the invention is to provide an elongated bumper as aforesaid whose impact absorption and resistance properties are improved by a dense dispersion of fibers reinforcing the core of the bumper.

A further object of the present invention is to provide a bumper with its mounting studs discretely anchored and held in the core solely through the retentive properties of the core substance with its reinforcing fibers embedded therein.

Further objects of the invention, more or less broad than the foregoing will become apparent from the following description of the constituent parts, elements and principles of one embodiment of the invention given herein solely by way of example with reference to the accompanying drawings wherein like reference numerals indicate like parts and wherein:

FIG. 1 is a perspective view of an elastomeric bumper according to the invention which is mounted on a metal bumper of an automobile;

FIG. 2 is a cross-sectional view of the automobile bumper with the elastomeric bumper mounted thereon taken along line 2—2 of FIG. 1;

FIG. 3 is a cross-sectional view of a hollow elastomeric bumper;

FIG. 4 is a perspective view of a portion of an elastomeric bumper with parts removed showing the bumper in greater detail, and FIG. 5 is a cross-sectional view of a portion of the elastomeric bumper shown in FIG. 4 taken along the line 5—5 thereof.

In FIG. 1 is seen elastomeric bumper B mounted on a conventional metal bumper of a vehicle to cushion the impacts which it receives in normal use.

As shown cross-sectionally in FIG. 2 the bumper B of the invention is comprised of an elastomeric overlay 2 on a core 4 also formed of elastomeric materials in which short fibers 6 are densely dispersed at random and integrally bonded to the core substance; it being observed that the area of the core 4 as it appears in said FIG. 2 is greater than the corresponding area of the overlay.

To all intents and purposes the respective substances of the core 4 and overlay 2 may be substantially the same. However, the dispersion of fibers 6 in the core substance tends to increase its impact resistance over that of overlay 2 but at the cost of some resilience and appearance in both of which respects the overlay 2 accordingly surpasses core 4. The overlay 2 also imparts improved weather resistance to bumper B; core 4 being more susceptible to the elements, presumably, because of the fibers 6 embedded therein, for example.

The short fibers within the core are not only densely dispersed therein but, preferably, are also trained in the longitudinal direction of the core 4, thus further adding to the tensile strength of the core. Prior to any curing procedures, the core substance with the fibers dispersed therein is preliminarily calendered between a pair of conventional calendering rolls; the fibers in the calendered materials being resultantly trained in a direction substantially perpendicular to the axes of the calendering rolls. The said calendered materials with their longitudinally trained fibers are then formed into an elongated core 4 with the fibers oriented in the longitudinal direction thereof.

Embedded within the core are spaced, preferably corrosion resistant, studs 8 projecting from the side 9 of the core not covered by the overlay; each said stud 8 having a broad head 8' completely embedded in the core substance as aforesaid with a shoulder 8", narrower than said head 8', lying approximately flush with the uncovered side 9 of the core 4. A core 4 containing embedded fibers 6 as aforesaid has been found in practice to possess great retentivity with regard to the studs 8 and to provide rigid anchorage therefor. In the result, the interconnection of the studs as by a wire is rendered unnecessary whereby the studs may be disposed discretely within the said core thereby simplifying the manufacturing procedure.

Moreover, the core 4 of the bumper B as hereinbefore described has been found to have a coefficient of thermal expansion lower than that of the overlay. This is seen to provide a further advantage in that with the core and overlay being integrally bonded together as will duly appear, the core will inhibit any tendency of the overlay to expand or contract, as the case may be, and thus enhance the dimensional stability of the bumper B.

While the core 4 is preferably solid as shown in FIGS. 2 and 4, for example, the invention need not, of course, be limited thereto as will be apparent from FIG. 3 showing a hollow bumper in cross-section in which the inventive principles have been embodied.

In the process of making the bumper B, a core 4 is formed of an elastomer aforesaid having short fibers 6 dispersed densely and randomly throughout it and integrally bonded to it. A thin overlay 2 of elastomeric material which is completely or substantially free of fibers such as are embedded in core 4 is then integrally bonded to the latter. Once thus bonded and molded the overlay 2 carries the external configuration of the bumper B.

Said core 4 in this embodiment is formed of an elastomer in which said fibers 6 of nylon, rayon, fiberglass or the like are embedded as aforesaid while the elastomer is still uncured. Preferably, the fibers are on the order of one-fourth to 1 inch or so in length. This composite of uncured elastomer and fibers is then passed through a calendering process between a pair of conventional calendering rolls which tends to orient the fibers in the composite and train them in a direction substantially perpendicular to the axes of the calendering rolls. In the subsequent forming of the core the calendered composite aforesaid is usually arranged so that the fibers 6 are trained in the longitudinal direction of the core when it is finally molded as shown in FIG. 4. An interesting point to note at this juncture is that because of the aforesaid longitudinal orientation of the fibers, the core substance has exhibited substantial resistance to tensile forces in view, presumably, of the tensile strength of the fibers themselves.

The calendered composite arranged as aforesaid with its fibers trained in the longitudinal direction of the core to be formed is then molded under relatively low heat and high pressure producing an uncured or semi-cured core with its fibers integrally bonded to the core substance.

Once the core is thus formed, the next step in the process involves depositing an overlay of uncured elastomeric material on said core with a bonding layer 10 sandwiched therebetween as shown in FIG. 4. The said overlay is subsequently molded to the core under relatively high heat and pressure vulcanizing both said overlay 2 and core 4 and integrally uniting them into an integral mass whose external configuration is carried by the overlay 2. It need hardly be observed at this point that the overlay 2 may embrace more or less of the core 4 than is shown in the drawing; the final configuration thereof being dictated by circumstances in specific cases.

As one preferred means of mounting the elastomeric bumper to the basic metal bumper of an automobile, the threaded studs 8 shown in FIGS. 2 and 5 are discretely embedded within the core during the molding thereof so as to project from the core side 9 not covered by the overlay; the studs 8 being, of course, preferably pre-coated with an appropriate bonding material.

What I claim is:

1. An integral elongated bumper having impact absorption properties comprising:
   an overlay of elastomeric material;
   a core of elastomeric material covered by said overlay and integral therewith;
   short fibers dispersed densely and randomly throughout said core and integrally bonded to the core substance, increasing the impact resistance of said core over that of the overlay;
   the cross-sectional area of said core exceeding that of the overlay.

2. A bumper as defined in claim 1 wherein said overlay provides a surface veneer for said core;
   the overlay substance having greater resilience and weather resistance than the core substance.

3. A bumper as defined in claim 1 wherein said fibers are trained substantially in the longitudinal direction of the core.

4. A bumper as defined in claim 1 wherein said overlay covers one side of said bumper and spaced studs, embedded in said core, project from its other side; each said stud having a broad head embedded as aforesaid and a shoulder narrower than said head, which is approximately flush with the said other bumper side.

5. A bumper as defined in claim 1 wherein said bumper is hollow.

6. A bumper as defined in claim 1 wherein said core has a lower coefficient of thermal expansion than said overlay.

7. A bumper as defined in claim 2 wherein said fibers are trained substantially in the longitudinal direction of the core providing said core with substantial tensile strength in its longitudinal direction.

8. A bumper as defined in claim 4 wherein said studs are discrete.

9. A bumper as defined in claim 4 wherein said studs are corrosion resistant.

10. A bumper as defined in claim 4 wherein said studs are corrosion resistant and discrete.

11. A bumper as defined in claim 7 wherein said overlay covers one side of said bumper and spaced studs, embedded in said core, project from its other side; each said stud having a broad head embedded as aforesaid and a shoulder narrower than said head, which is approximately flush with the said other bumper side.

12. A bumper as defined in claim 11 wherein said studs are discrete.

13. A bumper as defined in claim 11 wherein a bonding layer is interposed between said overlay and said core.

* * * * *